(12) United States Patent
Gerhardt et al.

(10) Patent No.: US 8,538,009 B2
(45) Date of Patent: *Sep. 17, 2013

(54) DONNED AND DOFFED HEADSET STATE DETECTION

(71) Applicant: Plantronics, Inc., Santa Cruz, CA (US)

(72) Inventors: John F Gerhardt, Los Gatos, CA (US); Timothy P Johnston, Los Gatos, CA (US); Edward L Reuss, Santa Cruz, CA (US); Robert M Khamashta, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,881

(22) Filed: Dec. 4, 2012

(65) Prior Publication Data

US 2013/0210497 A1    Aug. 15, 2013

Related U.S. Application Data

(62) Division of application No. 11/542,385, filed on Oct. 2, 2006, now Pat. No. 8,335,312.

(51) Int. Cl.
*H04R 25/00* (2006.01)
*H04M 1/00* (2006.01)
*H04M 9/00* (2006.01)

(52) U.S. Cl.
USPC .............................. 379/430; 381/74; 381/370

(58) Field of Classification Search
USPC ................ 381/71.2, 71.6, 71.9, 71.11, 71.13, 381/71.14, 72, 74, 370; 455/466, 569.1, 455/575.2, 557; 379/430
See application file for complete search history.

(56) References Cited

U.S. PATENT DOCUMENTS

| | | | |
|---|---|---|---|
| 3,109,893 | A | 11/1963 | Burns et al. |
| 4,330,690 | A | 5/1982 | Botros |
| 6,118,878 | A | 9/2000 | Jones |
| 6,130,953 | A | 10/2000 | Wilton et al. |
| 6,965,669 | B2 | 11/2005 | Bickford et al. |
| 7,010,332 | B1 | 3/2006 | Rvin et al. |
| 7,215,766 | B2 | 5/2007 | Wurtz |
| 7,646,863 | B2 | 1/2010 | Johnston |
| 2001/0044318 | A1 | 11/2001 | Mantyjarvi et al. |

(Continued)

FOREIGN PATENT DOCUMENTS

| | | |
|---|---|---|
| EP | 0564164 A1 | 10/1993 |
| GB | 2357400 A | 6/2001 |

(Continued)

OTHER PUBLICATIONS

Matsushita, "A headset-based minimized wearable computer," IEEE Intelligent Systems, May/Jun. 2001, 16(3):28-32. ISSN:1541-1672.

(Continued)

*Primary Examiner* — Mohammad Islam
*Assistant Examiner* — Phylesha Dabney

(57) ABSTRACT

An apparatus and method are provided for determining the donned or doffed state of a headset. In one example, a headset includes a processor, an acoustic transducer, and a detector operably coupled to the processor, the detector providing an output charge pattern corresponding to a state selected from the group consisting of the headset being donned and doffed. Advantageously, the present disclosure provides for reliably determining a donned or doffed state of a headset for efficiently routing calls, text messages, and/or otherwise being used for notifications and requests in a system.

3 Claims, 11 Drawing Sheets

(56) References Cited

U.S. PATENT DOCUMENTS

| | | |
|---|---|---|
| 2002/0021278 A1 | 2/2002 | Hinckley et al. |
| 2002/0068537 A1 | 6/2002 | Shim et al. |
| 2004/0105538 A1 | 6/2004 | Goebel |
| 2005/0170859 A1 | 8/2005 | Koike et al. |
| 2005/0221791 A1 | 10/2005 | Angelhag |
| 2006/0023865 A1 | 2/2006 | Nice et al. |
| 2007/0076897 A1 | 4/2007 | Philipp |
| 2007/0121959 A1 | 5/2007 | Philipp |
| 2008/0116849 A1 | 5/2008 | Johnston |
| 2009/0041313 A1 | 2/2009 | Brown |
| 2009/0281809 A1 | 11/2009 | Reuss |

FOREIGN PATENT DOCUMENTS

| | | |
|---|---|---|
| JP | 2000278785 a | 10/2000 |
| WO | WO 0076177 A1 | 12/2000 |
| WO | WO 0163888 A | 8/2001 |
| WO | WO 03103175 A1 | 12/2003 |
| WO | WO 2005099105 A1 | 10/2005 |

OTHER PUBLICATIONS

International Preliminary Report on Patentability, issued Apr. 7, 2009 for International Application No. PCT/US2007/020004.

Gregory et al., "SIP Communications for Dummies," Avaya Custom Edition, 2006, Wiley Publishing, Inc., Hoboken, NJ USA.

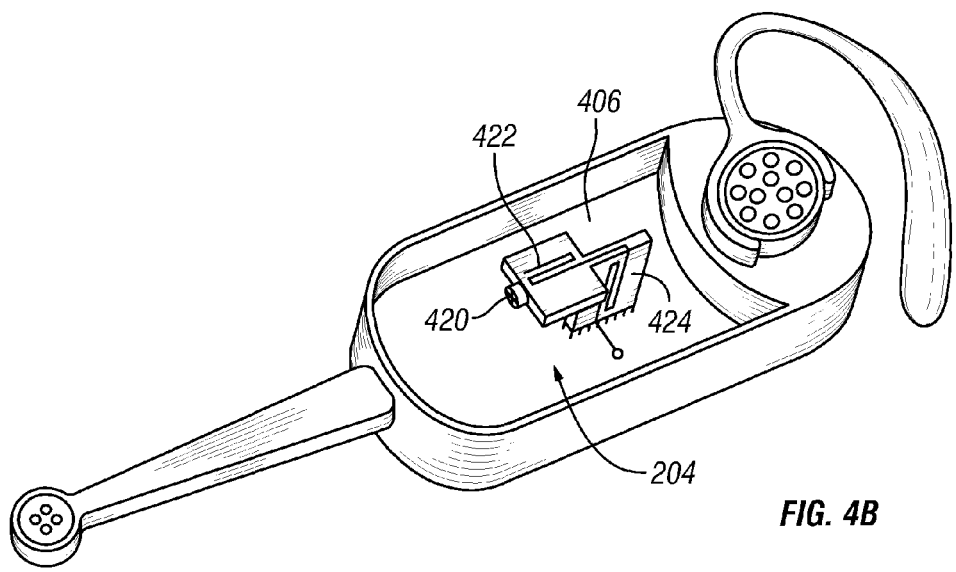
FIG. 4B
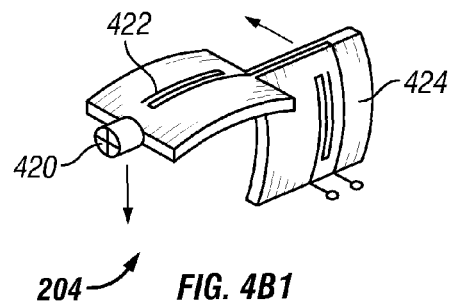
FIG. 4B1
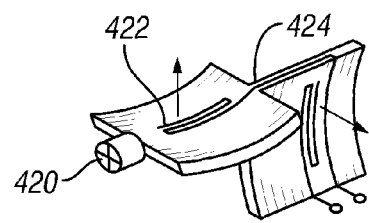
FIG. 4B2

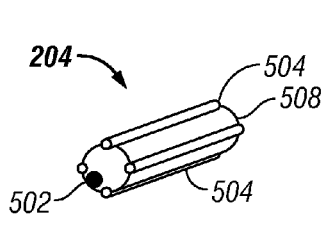
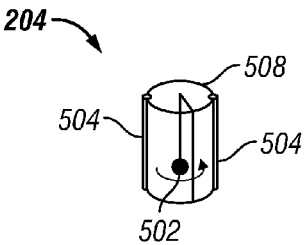
FIG. 5A         FIG. 5B
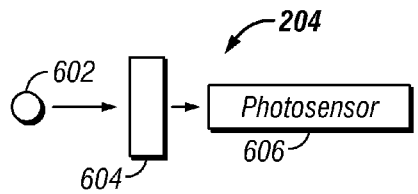
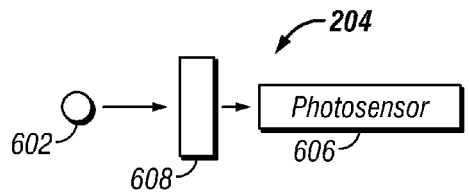
FIG. 6A         FIG. 6B
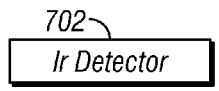
FIG. 7
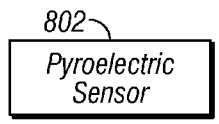
FIG. 8A
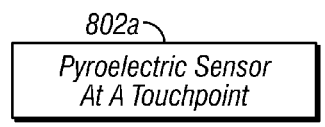
FIG. 8B
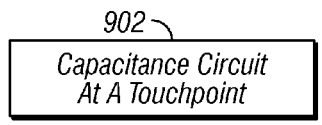
FIG. 9

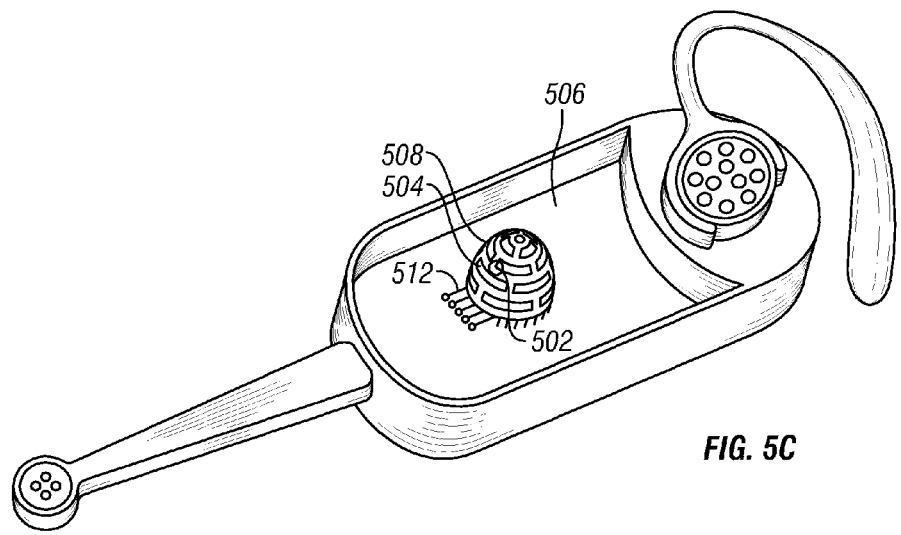
*FIG. 5C*
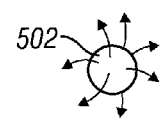
*FIG. 5C1*
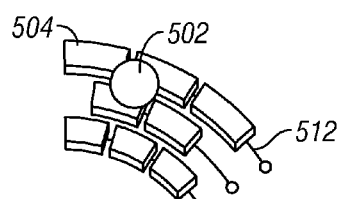
*FIG. 5C2*
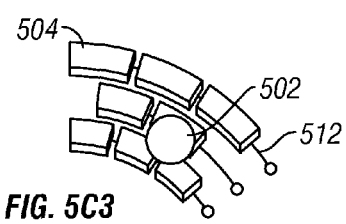
*FIG. 5C3*

Previous solutions have reduced the receive volume after each call, but this solution has caused great inconvenience to the user with significant hearing loss in that the user must manually return the receive volume to the previous level at the start of each phone call. This is particularly onerous in call center and office environments where the user handles many calls per hour.

In many consumer systems, plugging in and unplugging a headset as well as logging in and out of a system may be inconvenient, easily forgotten, and/or too unreliable. Thus, a reliable means and method for determining the donned or doffed state of a headset is highly desirable for providing notification to a system.

DONNED AND DOFFED HEADSET STATE DETECTION

CROSS-REFERENCE TO RELATED APPLICATIONS

This application is a divisional of U.S. Utility application Ser. No. 11/542,385, filed Oct. 2, 2006, which is incorporated herein in its entirety for all purposes.

TECHNICAL FIELD

The present invention relates generally to headset devices and, more particularly, to a method for determining when a headset is donned and doffed and a headset therefor.

BACKGROUND

Telephone headsets are used in various environments, such as call centers and offices, and a method and apparatus for determining whether a person is available at his or her telephone, computer, or work station allows for more efficient automation of many business processes.

For example, if an automated call distribution system at a call center receives a large number of incoming calls, a means and method to determine which of its local stations are connected to headsets presently worn by an agent allows for efficiency in routing calls.

In another example, in circumstances common in many businesses, an individual may use multiple different telephones or headsets over the course of a day. Such telephones may include cellular telephones, conventional analog or digital telephones, Internet Protocol (IP) telephones, and computers running software which acts as an IP telephone. If the headsets worn by the individual in the course of using these different telephones can determine when they are actually being worn, this state can be communicated to call routing devices so that calls for that individual can be efficiently routed to the telephone he or she is currently using.

Previously, the detection of current flow to a headset has been used to determine that a headset is physically connected to a particular telephone, and then the inference is made that because a headset is physically connected, a person must be available at that telephone or headset. This inference fails, however, when the user removes the headset from his head and leaves the headset behind still connected to the telephone, computer, and/or system. For example, a home user may have no need to remove the headset from the computer when the user departs from the system.

Another previous means and method for determining a headset state has included software that requires the user to login to indicate that the user is available to receive calls. Again, if the user moves away from the computer without logging out, the system will erroneously indicate the user's availability at that computer.

In another application, the ADA has established a requirement for telephone earphone volume control that provide increased volume for users with significant hearing loss. This requirement mandates that a telephone with extended receive volume control range must reduce the volume to a safe level appropriate for a user that does not suffer from significant hearing loss whenever the user has hung up the telephone. This requirement is intended to protect the hearing of a telephone user that does not suffer from significant hearing loss when the user uses a telephone that is normally used by a person that does suffer from significant hearing loss.

SUMMARY

The present invention provides an advantageous apparatus and method for determining the donned or doffed state of a headset.

In one embodiment of the present invention, a headset is provided, the headset comprising a processor, an acoustic transducer, and a detector operably coupled to the processor, the detector providing an output charge pattern corresponding to a state selected from the group consisting of the headset being donned and doffed.

In accordance with another embodiment of the present invention, another headset is provided, the headset comprising a processor, an acoustic transducer, and a detector operably coupled to the processor, wherein the detector provides an output charge pattern, and further wherein the detector is selected from the group consisting of a motion detector and a non-motion detector. The headset also includes a circuit operably coupled to the detector for determining whether the output charge pattern corresponds to a state selected from the group consisting of the headset being donned and doffed.

In accordance with yet another embodiment of the present invention, a method of determining a headset state is provided, the method comprising providing a headset including a processor, a detector operably coupled to the processor, and a donned-doffed recognition circuit operably coupled to the detector, and detecting a headset characteristic selected from the group consisting of kinetic energy, temperature, and capacitance. The method further includes transforming the detected headset characteristic into an output charge, and processing a plurality of output charges to determine an output charge pattern corresponding to a state selected from the group consisting of the headset being donned and doffed.

Advantageously, the present invention allows for the efficient routing of calls and messages to donned headsets and for maintaining volume settings between calls for hearing impaired users while protecting the hearing of a non-hearing impaired user who subsequently uses the same telephone or headset.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A and 4B show a motion detector comprising an acceleration sensor used in a headset in accordance with another embodiment of the present invention.

FIGS. 4B1 and 4B2 show one embodiment of an acceleration sensor having strain gauges.

FIGS. 5A and 5B illustrate a detector comprising a movable conductor and a capsule used in a headset in accordance with an alternative embodiment of the present invention.

FIGS. 5C, 5C1-5C3 show the detector of FIGS. 5A and 5B in greater detail.

FIGS. 6A and 6B show a motion detector comprising a light source, photosensor and movable reflective surface used in a headset in accordance with another embodiment of the present invention.

FIG. 7 illustrates an infra-red detector used in a headset in accordance with an alternative embodiment of the present invention.

FIGS. 8A and 8B show a detector comprising a pyroelectric sensor used in a headset in accordance with another embodiment of the present invention.

FIG. 9 illustrates a detector comprising a capacitance circuit used in a headset in accordance with a different embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an advantageous apparatus and method for determining the donned or doffed state of a headset.

Figure 1:
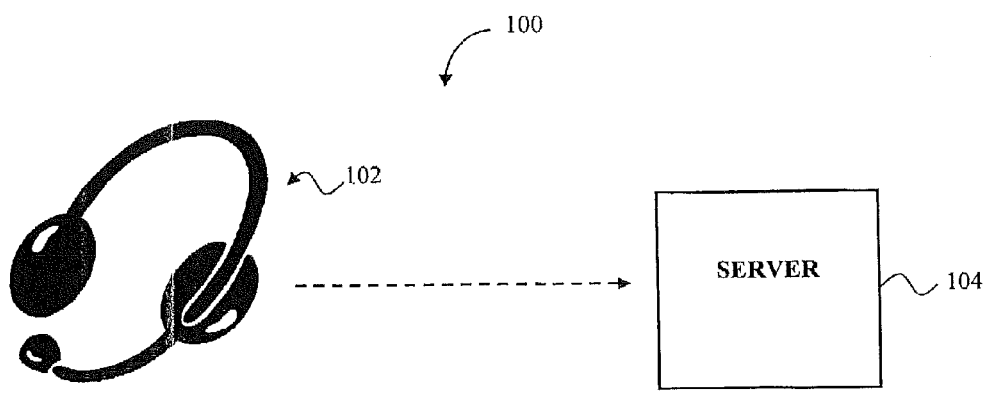
FIG. 1 shows a system including a headset server and a headset (wired or wireless) capable of indicating a donned or doffed state of the headset in accordance with an embodiment of the present invention.

Referring now to FIG. 1, a system 100 is illustrated in accordance with an embodiment of the present invention. System 100 includes a headset 102 and a headset server 104 operably coupled together. Other elements may be between headset 102 and server 104, such as but not limited to, adaptors, access points, and/or networks. It is noted that server 104 may be used to route calls to multiple headsets, for example, at a call center.

Headset 102 may be wired or wireless. In one example, headset 102 may be wired to an adaptor which is coupled to a network, or headset 102 may be wirelessly coupled to an access point (AP) (not shown), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP).

In one example, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Figure 2:
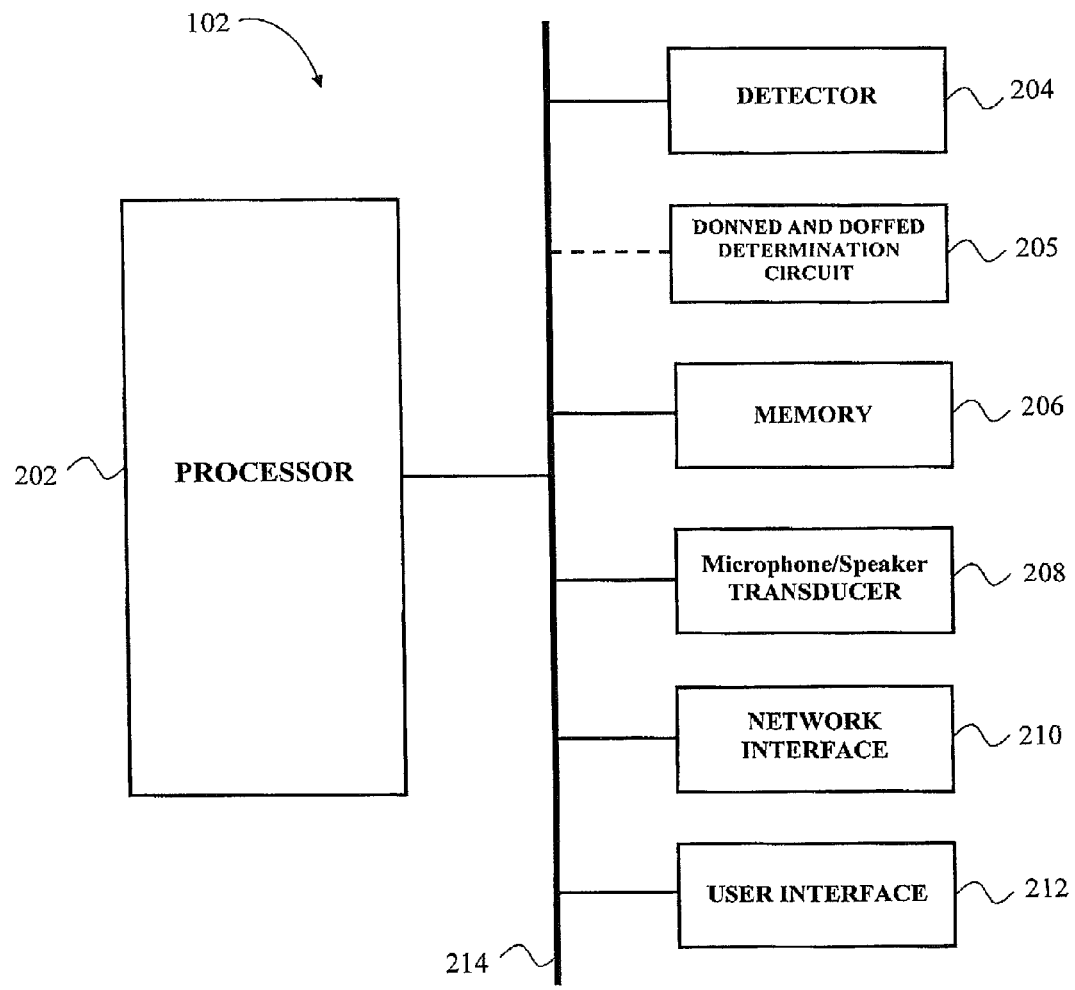
FIG. 2 shows a block diagram of a headset capable of indicating a donned or doffed state in accordance with an embodiment of the present invention.

Referring now to FIG. 2 in conjunction with FIG. 1, a block diagram of an example of headset 102 is shown in accordance with an embodiment of the present invention. Headset 102 includes a processor 202 operably coupled via a bus 214 to a detector 204, a donned and doffed determination circuit 205, a memory 206, a transducer 208, an optional network interface 210, and an optional user interface 212.

Processor 202 allows for processing data, in particular managing data between detector 204, determination circuit 205, and memory 206 for determining the donned or doffed state of headset 102. In one embodiment, processor 202 may also process information about access points, service providers, and service accounts for wireless headsets. In one example, processor 202 is a high performance, highly integrated, and highly flexible system-on-chip (SOC), including signal processing functionality such as echo cancellation/reduction and gain control in another example. Processor 202 may include a variety of processors (e.g., digital signal processors), with conventional CPUs being applicable.

Detector 204 includes a motion detector and/or a non-motion detector providing output charges based upon a headset characteristic such as kinetic energy, temperature, and/or capacitance.

In the case of a motion detector, as the user wears the headset, subtle movements of the head (e.g., from standing, sitting, walking, or running) cause movements of the headset, and detector 204 transfers kinetic energy from head and body movement into an electromotive force, or an output charge. In other words, motion of the headset induces a small fluctuating current flow in a nearby electrical conductor. Current in this conductor is amplified electronically. The output charges may be provided at predetermined or varying intervals (e.g., sampling every 5 seconds) and for predetermined or varying periods (e.g., based on time or number of samples) to form an output charge pattern.

Detector 204 is operably coupled to a determination circuit 205 for determining whether a plurality of the output charges form an output charge pattern corresponding to a state selected from the group consisting of the headset being donned and doffed. In one example, determination circuit 205 compares the output charge pattern to a predetermined profile, and if the pattern is within the bounds of the predetermined profile, the headset is considered to be in a state of being donned. When there is no recognized output charge pattern for a predetermined period, then the headset may be considered to be abandoned and in a state of being doffed. In another embodiment, the output charge pattern may be recognized as a doffed output charge pattern. The output charges may be shaped using a comparator circuit which is connected to an input pin on a general purpose microcontroller. Firmware in the microcontroller may implement a filtering algorithm to discriminate between movement of a headset when doffed and the occasional movements caused by relocating a non-worn headset from one location to another. In this example, determination circuit 205 is an individual component operably coupled to other components of headset 102 via bus 214, but determination circuit 205 may be placed in various places as shown by the dashed line connection, for example being integrated with processor 202 or detector 204, stored in memory 206, or being provided from outside of headset 102, for example at server 104.

In the case of a non-motion detector, as the user wears the headset, detector 204 transfers temperature and/or capacitance readings into an electromotive force, or an output charge. Current in this conductor is amplified electronically and processed as described above with respect to motion detectors. Again, the output charges may be provided at predetermined or varying intervals and for predetermined or varying periods to form an output charge pattern.

Memory 206 may include a variety of memories, and in one example includes SDRM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 may store determination circuit 205, output charges and patterns thereof from detector 204, and predetermined output charge profiles for comparison to determine the donned and doffed state of a headset.

Transducer 208 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth™ protocols and hardware, in one example.

Network interface 210 allows for communication with APs, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet), or an adaptor for providing wired communications to a network. In one example, network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over the network using the network address that it derives for the headset. In one embodiment, network interface 210 is able to transmit and receive digital and/or analog signals, and in one example communicates over the network using IP, wherein the network interface uses the headset's MAC address or another globally unique address as its IP address. In particular, network interface 210 may be operably coupled to a network via the IEEE 802.11 protocol. However, the network interface 210 may communicate using any of various protocols known in the art for wireless or wired connectivity.

An example of an applicable network interface and the Internet protocol layers (and other protocols) of interest for the present invention are described in pending U.S. patent application Ser. No. 10/091,905 filed Mar. 4, 2002, the full disclosure of which is hereby incorporated by reference for all purposes.

User interface 212 allows for manual communication between the headset user and the headset, and in one example includes an audio and/or visual interface such that a prompt may be provided to the user's ear and/or an LED may be lit.

Referring now to FIGS. 3 through 13, different embodiments of detector 204 are described in accordance with the present invention. FIGS. 3 through 6 illustrate examples of motion detectors, and FIGS. 7 through 13 illustrate examples of non-motion detectors in accordance with the present invention.

Figure 3A:
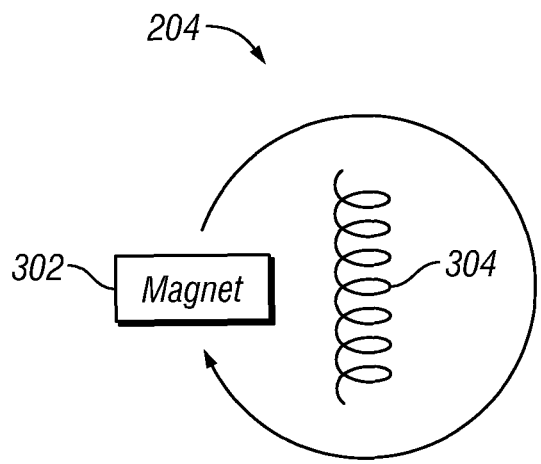
FIGS. 3A to 3F show a motion detector comprising a magnet and conductor used in a headset in accordance with one embodiment of the present invention.
Figure 3B:
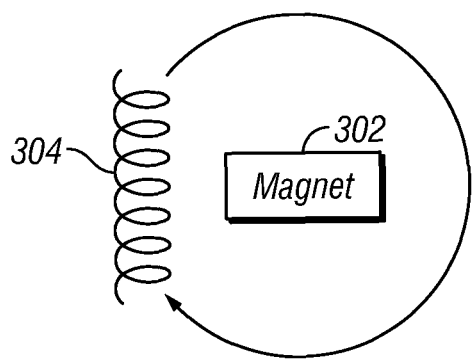

FIGS. 3A and 3B illustrate a magnet 302 and a conductor 304, such as a coil, that move relative to one another such that an output charge is generated in accordance with an embodiment of the present invention. FIG. 3A illustrates a movable magnet 302 that moves relative to a fixed conductor 304, and FIG. 3B illustrates a movable conductor 304 that moves relative to a fixed magnet 302. The movable component may be hinged, suspended mechanically, or otherwise movably coupled so that gravity or inertia drives slight movement with respect to the headset whenever the headset wearer moves his head or body. In one example, the fixed magnet may be the same magnet used in a moving-coil transducer contained in the headset. The induced current in the conductive element is amplified, sent to a donned and doffed determination circuit (for example a part of a printed circuit board assembly), and processed as described above to determine a state of the headset.

Figure 3C:
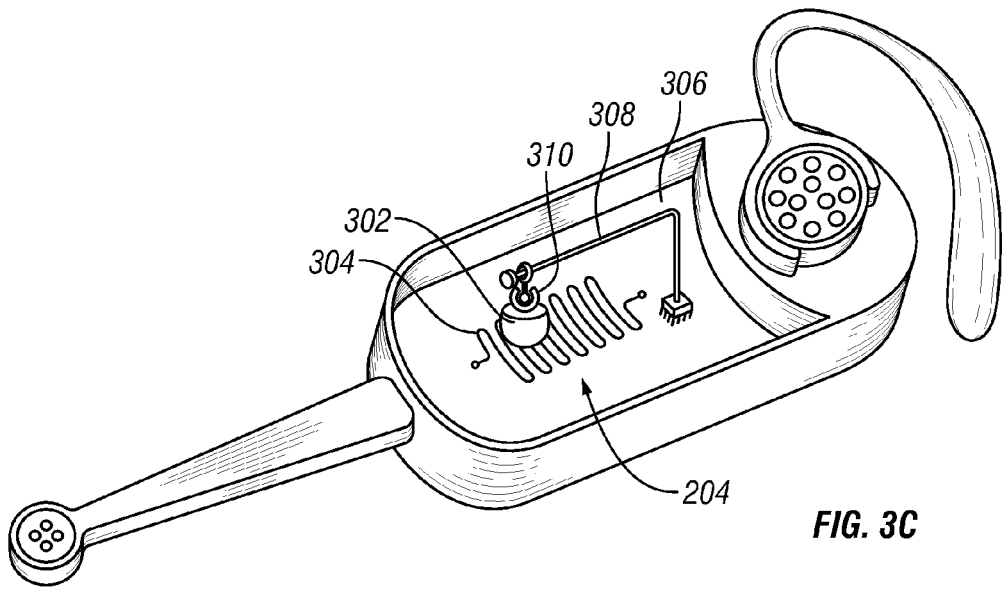
Figure 3D:
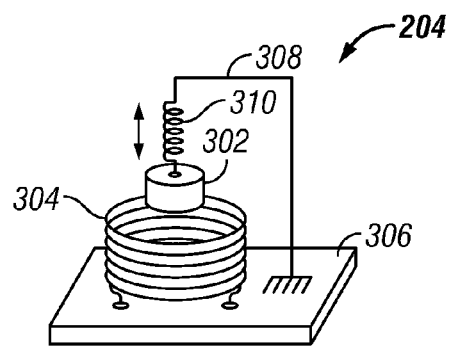
Figure 3E:
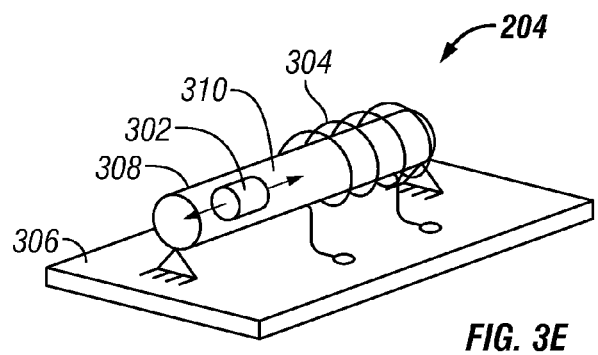

FIGS. 3C through 3E illustrate in more detail embodiments of magnet 302 movable with respect to a fixed conductor 304 in accordance with the present invention. FIGS. 3C, 3D, and 3E show a movable magnet 302 and a fixed conductor 304, which is operably coupled to a printed circuit board assembly (PCBA) 306.

In FIGS. 3C and 3D, magnet 302 is movably coupled to magnet support 308 via a joint 310, which allows magnet 302 to move in various directions relative to conductor 304. In FIG. 3C, joint 310 may include a ball-and-socket type joint slidably coupled along support 308 allowing magnet 302 to move over trace conductor 304. In FIG. 3D, joint 310 may include a spring that allows magnet 302 to move along an interior of coil conductor 304. In FIG. 3E, magnet 302 is movable within support 308, which is filled with a fluid 310, in one example a ferrofluid, allowing magnet 302 to move along an interior of coil conductor 304 that surrounds at least a portion of support 308.

Figure 3F:
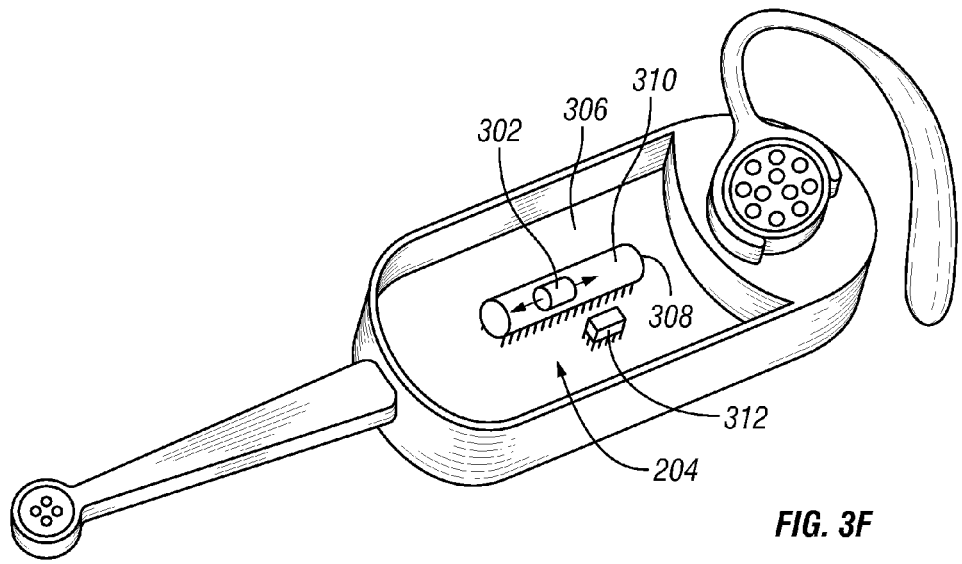

FIG. 3F shows a similar detector as in FIG. 3E, including magnet 302, PCBA 306, support 308, and fluid 310, but instead of conductor 304, a sensor 312 is positioned proximate to support 308 for sensing movement of magnet 302 (e.g., sensing if the magnet passes the sensor). In one example, with no intent to limit the invention thereby, sensor 312 may include a Hall effect sensor, a reed switch, and/or an optical switch.

Figure 4A:
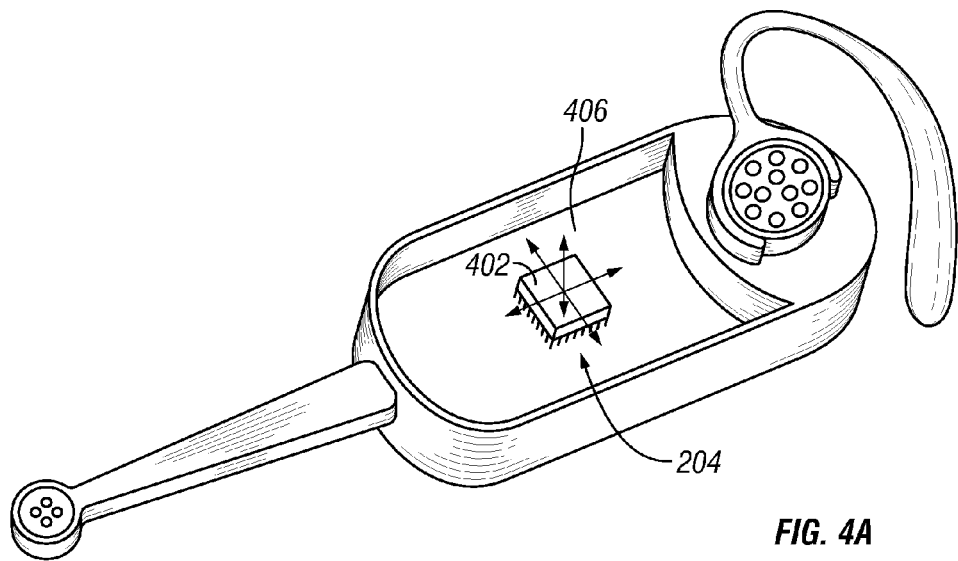

FIG. 4A illustrates an acceleration sensor 402 operably coupled to a PCBA 406 in accordance with an embodiment of the present invention. In one example, acceleration sensor 402 includes a mass affixed to a piezoelectric crystal. The mass is coupled to a supporting base through the piezoelectric crystal. When the sensor is subjected to kinetic activity, the sensor experiences force due to the acceleration of the mass, thereby exerting a force on the crystal. This force results in an output charge of the crystal that is directly proportional to the input acceleration. The variations in force against the crystal resulting from the movements of the headset result in various output charges. The output charge is amplified, sent to a donned and doffed determination circuit, and processed as described above to determine a state of the headset.

Examples of applicable micro-electronic mechanical acceleration sensors, such as piezoelectric accelerometers, are dual and tri-axis accelerometers model series KXM and KXP, available from Kionix, Inc. of Ithaca, N.Y. Various piezoelectric crystal materials may be used for the accelerometer construction, such as ceramic lead metaniobate, lead zirconate, lead titanate, and natural quartz crystal. Various mechanical configurations of the masses and crystals may also be used, including but not limited to isolated compression, shear, and ring shear, to name a few.

In another embodiment, acceleration sensor 402 may include strain gauges in one or more axes of the headset, as illustrated in FIGS. 4B, 4B1, and 4B2. In one example, detector 204 includes a mass 420 coupled to an end of a flexible membrane 424 and thin electrical traces 422 (strain gauge element) on flexible membrane 424 and operably coupled to PCBA 406. FIGS. 4B1 and 4B2 illustrate membrane 424 flexing along opposite directions, respectively, as illustrated by the arrows. The flexing of membrane 424 effectively lengthens and thins (flexes, compresses, and/or elongates) the traces 422, increasing the resistance through the trace pattern. Kinetic energy from movement of the headset causes variations in the resistance of the trace pattern, thereby allowing for determination of a donned or doffed state of the headset.

FIGS. 5A and 5B illustrate a detector 204 including a movable conductor 502 and a capsule 508 having electrical contacts 504 in accordance with an embodiment of the present invention. FIG. 5A illustrates conductor 504 that is loosely contained within capsule 508, and FIG. 5B illustrates conductor 502 that is suspended within capsule 508. Conductor 502 is made of electrically conductive material and movable such that gravity and/or inertia causes conductor 502 to move with respect to the headset whenever the headset wearer moves the headset. Electrical contacts 504 are positioned within capsule 508 such that contact with movable conductor 502 causes an electric current or output charge to be produced, which is amplified, sent to a donned and doffed determination circuit, and processed as described above to determine a state of the headset.

In FIG. 5A, conductor 502 closes a circuit by bridging a gap between electrical contacts 504, allowing an electric current to flow intermittently. In FIG. 5B, conductor 502 is suspended from a pivot point inside the headset so that headset movement causes the conductor to move and touch contact points that surround the conductor, effectively closing and opening a circuit to thereby allow electric current to flow intermittently.

In another example, the electrical contacts may be configured in groups of two or more sets so that the motion of the weight in differing directions may be registered, thereby providing more data for determining the headset state. For example, a movable conductive mass is loosely contained in a housing that includes many contacts, such that movement of the mass opens and closes circuits as the mass makes and breaks contact with the housing contacts. The sensitivity of this detector can be tuned to detect the axis or direction of the movement, where alternate contacts are connected to different points on the circuit. Accordingly, this configuration can be arranged to determine when the user of the headset is shaking his or her head from side-to-side or nodding up and down, differentiating between the two motions by monitoring which circuit(s) are opening and closing, thereby allowing the user to input information into the headset, such as when responding to a call-answer prompt with a nod "yes" or shake of the head "no".

FIGS. 5C, 5C1, 5C2, and 5C3 illustrate in greater detail an embodiment of a detector 204 including a movable conductor 502 and a fixed capsule 508 having electrical contacts 504 operably coupled to a PCBA 506. Conductor 502 is freely movable within spherical capsule 508 (as shown by arrows in FIG. 5C1), and creates or closes different circuits 512 as conductor 502 makes contact with electrical contacts 504 (as shown by FIGS. 5C2 and 5C3).

FIGS. 6A and 6B illustrate a detector 204 including a light source 602, a photosensor 606, and a movable reflective surface 604, 608 therebetween in accordance with an embodiment of the present invention. FIG. 6A illustrates surface 604 that may be suspended, pinned, or loosely trapped, such that surface 604 at a rest state allows photosensor 606 to receive light from light source 602. Movement of the headset causes surface 604 to move such that photosensor 606 detects a change in the amount of light received and induces fluctuating current flow in a nearby electrical conductor. Alternatively, in FIG. 6B, surface 608 may be suspended, pinned, or loosely trapped, such that surface 608 at a rest state impedes light from reaching photosensor 606. Movement of the headset causes surface 608 to move such that photosensor 608 detects a change in the amount of light received and induces fluctuating current flow in a nearby electrical conductor. The current flow or output charge produced is amplified, sent to a donned and doffed determination circuit, and processed as described above to determine a state of the headset. In yet another example, surface 604, 608 could include a hole through which light from light source 602 travels, thereby providing changed amount of light received by photosensor 606 as the surface 604, 608 moves as the headset is moved.

As noted above, detector 204 may include a non-motion detector that provides output charges based upon a headset characteristic such as temperature and/or capacitance. When a headset is properly worn, several surfaces of the headset touch or are in operable contact with the user. These touch/contact points can be monitored and used to determine the donned or doffed state of the headset.

FIG. 7 illustrates an infra-red (IR) detector 702 that is sensitive to the temperature of a human body. Humans having a skin temperature of about 93 degrees Fahrenheit, radiate infra-red energy with a wavelength between about 9 and 10 micrometers. Therefore, the IR detector may be configured to be sensitive in the range of 8 to 12 micrometers, and may be positioned to aim at a point where the headset is intended to contact a user's skin, such as the user's skin or hair. When the headset user dons the headset, the IR detector 702 detects radiation in the wavelengths between 9 and 10 micrometers and provides an electrical signal or output charge that is amplified, sent to a donned and doffed determination circuit, and processed as described above to determine a state of the headset.

FIGS. 8A and 8B illustrate a pyroelectric sensor 802 that is positioned in close proximity to a point where the headset is intended to contact a user's skin. The sensor detects a user is present by determining a skin temperature near 93 degrees Fahrenheit and then providing an electrical signal or output charge that is amplified, sent to a donned and doffed determination circuit, and processed as described above to determine a state of the headset. As shown in FIG. 8B, two pyroelectric sensors 802a and 802b may be used, with one sensor positioned close to a contact point and the other positioned in a location away from a contact point. Differences (a delta) between the readings of the two sensors can be used to determine a donned or doffed state of the headset, for example if the delta of the two temperature readings is at or above a predetermined level.

FIG. 9 illustrates an electronic circuit 902 sensitive to capacitance positioned in close proximity to a point where the headset is intended to contact a user's skin. The circuit detects an increase in capacitance when the headset is worn and provides an output charge that is amplified, sent to a donned and doffed determination circuit, and processed as described above to determine a state of the headset.

Figure 10:
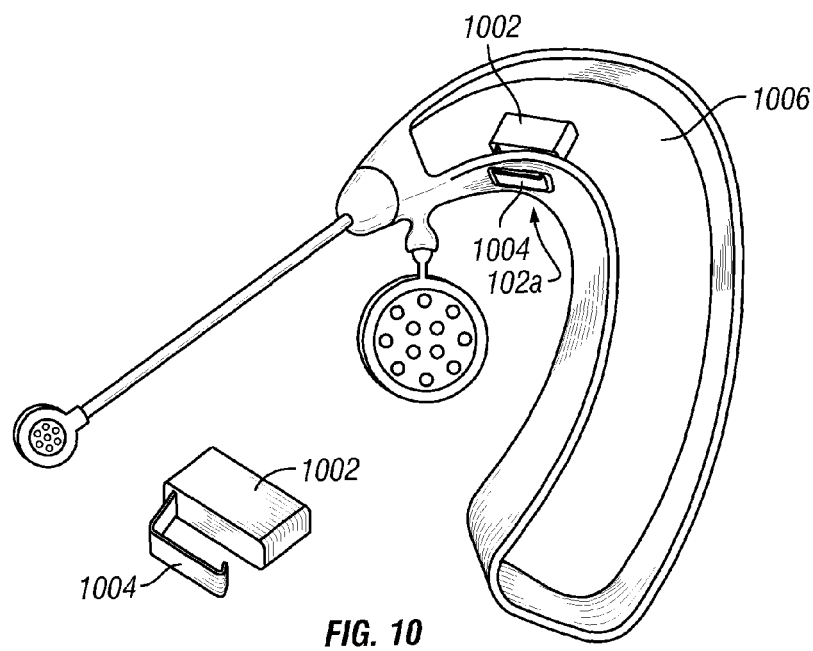
FIG. 10 shows a detector comprising a micro-switch used in a headset in accordance with an alternative embodiment of the present invention.

Other detectors that may be used at a touch point include micro-switches, as shown in FIG. 10. A micro-switch 1002 can be housed and operably coupled to a PCBA 1006 within the headset device such that an actuator 1004 of the switch is positioned at a touch point 102a of the headset, thereby being depressed when the headset is worn. A determination circuit in PCBA 1006 can monitor the state of the switch, thereby determining the state of the headset.

Figure 11:
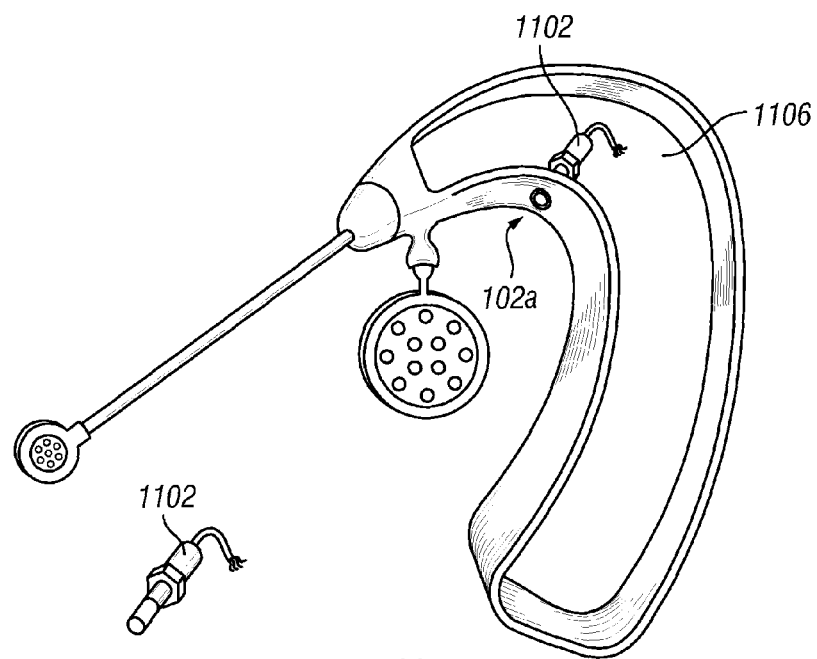
FIG. 11 shows a detector comprising an inductive proximity sensor used in a headset in accordance with another embodiment of the present invention.

Another detector that may be used includes an inductive proximity sensor 1102, as shown in FIG. 11. A proximity switch 1102 can be housed and operably coupled to a PCBA 1106 within the headset device such that the switch 1102 is positioned at a touch point 102a of the headset, thereby being triggered or activated when the headset is worn. This use of a proximity switch does not require force from the user's skin, but proximity to the user (without consistent force) such that a change in magnetic field is detected is sufficient to trigger the sensor. A determination circuit in PCBA 1106 can monitor the state of the switch, discriminating between a donned or doffed state of the headset.

Figure 12:
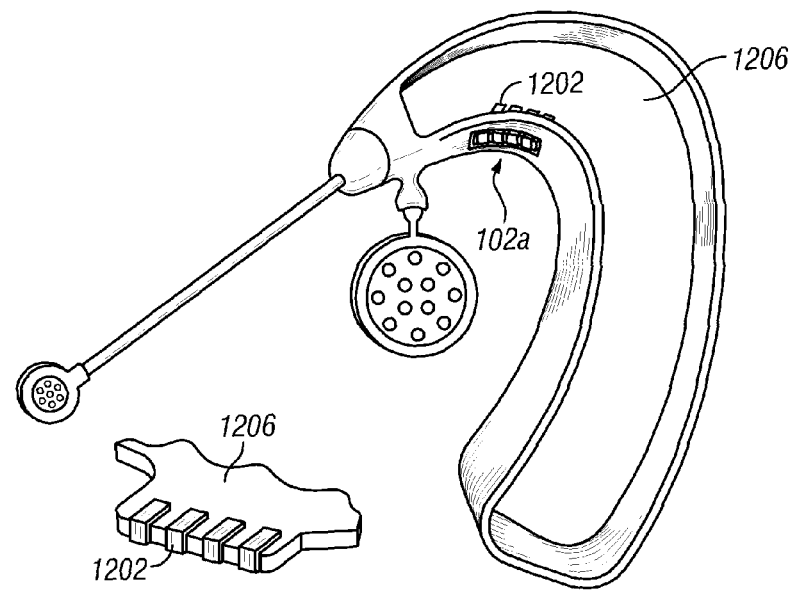
FIG. 12 illustrates a detector comprising skin resistivity sensor used in a headset in accordance with one embodiment of the present invention.

Yet another detector that may be used includes a skin resistivity sensor 1202, as shown in FIG. 12. Conductive materials 1202 can be used at two or more touch points 102a on the headset, and a circuit in PCBA 1206 can monitor the resistance between these conductive materials, thereby detecting a resistance that is consistent with a predetermined range, thus discriminating between a donned and a doffed state of the headset. That is, when the two or more contact points are in contact with the user's skin, the resistance reading between these contact points will be different from when the headset is not worn, for example the resistance being reduced when the headset is worn due to the skin adding conductance.

Figure 13:
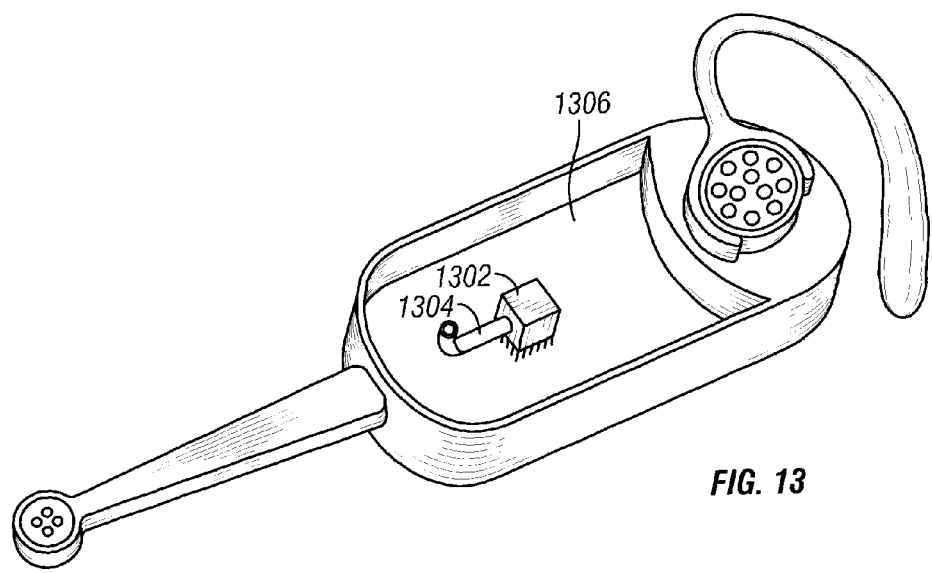
FIG. 13 shows a detector comprising a carbon dioxide sensor used in a headset in accordance with another embodiment of the present invention.

Referring now to FIG. 13, another detector that may be utilized includes a carbon dioxide ($CO_2$) sensor 1302 operably coupled to a PCBA 1306 and a channel 1304 in accordance with an embodiment of the present invention. Sensor 1302 is able to detect an increase of $CO_2$, thereby inferring a donned state of a headset. In one embodiment, sensor 1302 is able to subtract background $CO_2$ levels to more accurately discriminate between donned and doffed states, and in another embodiment, sensor 1302 and a determination circuit are able to detect patterns of $CO_2$ levels correlating to human breathing patterns.

It is noted that a variety of detectors that provide an output charge pattern corresponding to a donned or doffed state of a headset are within the scope of the present invention.

In critical applications, two or more of the embodiments described above may be used in one headset in order to determine a donned or doffed headset state with greater accuracy and reliability. For example, in one case with one motion detector and one non-motion detector being used, a headset state can be indicated when both detectors indicate the same state.

Figure 14:
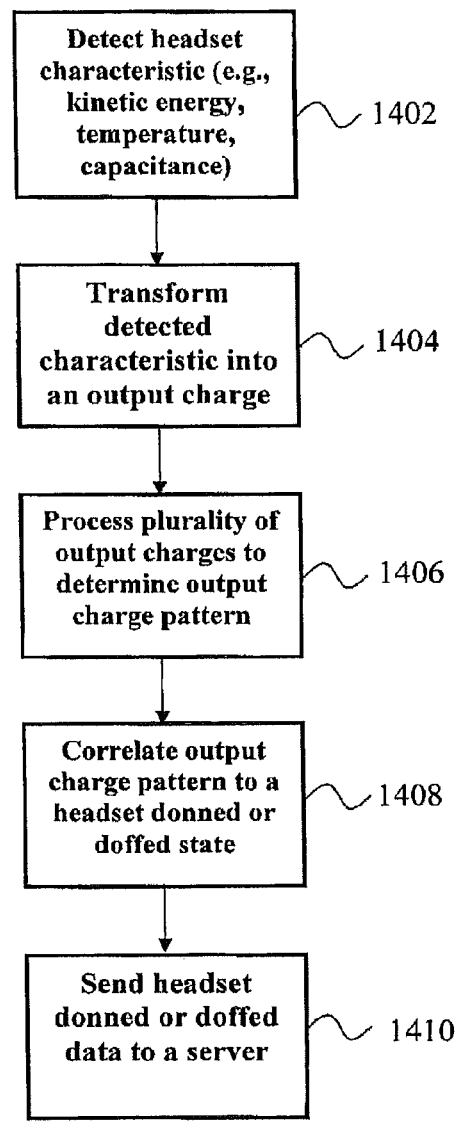
FIG. 14 is a flowchart showing a method of determining a donned or doffed state of a headset in accordance with embodiments of the present invention.

Referring now to FIG. 14 in conjunction with FIGS. 1 and 2, a flowchart of a method for determining the donned or doffed state of a headset is illustrated in accordance with an embodiment of the present invention. At step 1402, a headset characteristic, such as kinetic energy, temperature, and/or capacitance, is detected by a detector 204. At step 1404, the detector provides an output charge corresponding to a detected characteristic. The output charge is amplified and transferred to determination circuit 205. At step 1406, a plurality of output charges are processed by determination circuit 205 to determine an output charge pattern. At step 1408, determination circuit 205 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. At step 1410, the headset state may be sent to server 104 for routing of calls or messages, or for notifying a system regarding volume control for hearing impaired use.

Advantageously, the present invention provides a headset and method for reliably determining a donned or doffed state of a headset for efficiently routing calls, text messages, and/or otherwise being used for notifications and requests in a system. For example, the present invention allows for maintaining volume settings between calls for hearing impaired users while protecting the hearing of a non-hearing impaired user who subsequently uses the same telephone or headset.

Embodiments described above illustrate but do not limit the invention. It should also be understood that numerous modifications and variations are possible in accordance with the principles of the present invention. Although headsets are described above, the present invention may be used in a variety of head-worn devices, such as a head-mounted computer display. Accordingly, the scope of the invention is defined only by the following claims.

What is claimed is:

1. A headset system, comprising:
   a headset body;
   a microphone coupled to the headset body;
   an audio transducer coupled to the headset body;
   a motion detector coupled to the headset body and being operative to provide an output in response to movement of the headset body; and
   a processor for receiving the motion detector output from the motion detector and for determining whether head motion in response to a call-answer prompt is a nod "yes" or shake of the head "no."

2. The headset system of claim 1 wherein the processor is located in the headset body.

3. The headset system of claim 1 further comprising a wireless transceiver for reporting the response to the call-answer prompt over a wireless link.

* * * * *